(12) United States Patent
Venrooij et al.

(10) Patent No.: US 10,913,191 B2
(45) Date of Patent: Feb. 9, 2021

(54) MOULD, MOULDING APPARATUS AND METHOD FOR CONTROLLED OVERMOULDING OF A CARRIER WITH ELECTRONIC COMPONENTS AND MOULDED PRODUCT

(71) Applicant: Besi Netherlands B.V., Duiven (NL)

(72) Inventors: Johannes Lambertus Gerardus Maria Venrooij, Duiven (NL); Albertus Franciscus Gerardus Van Driel, Gendt (NL)

(73) Assignee: Besi Netherlands B.V., Duiven (NL)

( * ) Notice: Subject to any disclaimer, the term of this patent is extended or adjusted under 35 U.S.C. 154(b) by 527 days.

(21) Appl. No.: 15/535,484

(22) PCT Filed: Dec. 10, 2015

(86) PCT No.: PCT/NL2015/050854
§ 371 (c)(1),
(2) Date: Jun. 13, 2017

(87) PCT Pub. No.: WO2016/099256
PCT Pub. Date: Jun. 23, 2016

(65) Prior Publication Data
US 2017/0355111 A1    Dec. 14, 2017

(30) Foreign Application Priority Data

Dec. 15, 2014    (NL) .................................. 2013978

(51) Int. Cl.
*B29C 45/02*    (2006.01)
*B29C 45/56*    (2006.01)
(Continued)

(52) U.S. Cl.
CPC ........ *B29C 45/02* (2013.01); *B29C 45/14655* (2013.01); *B29C 45/56* (2013.01);
(Continued)

(58) Field of Classification Search
CPC ............. B29C 45/02; B29C 45/14065; B29C 2045/14163; B29C 45/56; B29C 33/68;
(Continued)

(56) References Cited

U.S. PATENT DOCUMENTS 4,954,308 A * 9/1990 Yabe ................. B29C 45/14647
257/E21.504
6,261,501 B1    7/2001 Miyagawa et al.
(Continued)

FOREIGN PATENT DOCUMENTS

EP    2803465 A1    11/2014
JP    5923526 A    2/1984
(Continued)

*Primary Examiner* — Joseph S Del Sole
*Assistant Examiner* — Jerzi H Moreno Hernandez
(74) *Attorney, Agent, or Firm* — The Webb Law Firm

(57) ABSTRACT

A mould includes at least two mould parts, one of which includes a mould cavity for enclosing electronic components placed on a carrier and a contact surface for at least partially enclosing the mould cavity, contacting the carrier, and forming a tight connection with the carrier. A feed channel is recessed into the contact surface and the mould part further includes a displaceable barrier element that is displaceable in a direction substantially perpendicular to the contact surface connecting to the feed channel for regulating the size of a passage in the feed channel. A foil handler applies a foil layer between a wall of the feed channel and the displaceable barrier element which is configured for exerting a pressure onto the foil layer when the mould parts are moved apart to release the carrier with electronic components from the mould part.

7 Claims, 3 Drawing Sheets

(51) Int. Cl.
*B29C 45/14* (2006.01)
*B29C 33/68* (2006.01)
*B29C 45/40* (2006.01)

(52) U.S. Cl.
CPC .............. *B29C 33/68* (2013.01); *B29C 45/40* (2013.01); *B29C 2045/14163* (2013.01); *B29C 2045/14663* (2013.01)

(58) Field of Classification Search
CPC .............. B29C 45/40; B29C 45/14655; B29C 2045/14663
See application file for complete search history.

(56) References Cited

U.S. PATENT DOCUMENTS

| | | | |
|---|---|---|---|
| 6,344,162 B1* | 2/2002 | Miyajima | ............... B29C 43/18 264/272.14 |
| 7,608,486 B2 | 10/2009 | Weggen et al. | |
| 2002/0017738 A1* | 2/2002 | Miyajima | ............. H01L 21/565 264/272.17 |
| 2002/0140122 A1 | 10/2002 | Kobayashi et al. | |
| 2004/0048416 A1* | 3/2004 | Takase | .................... B29C 33/68 438/106 |
| 2009/0045548 A1* | 2/2009 | Venrooij | ................. B29C 33/24 264/272.15 |
| 2009/0115098 A1* | 5/2009 | De Vries | ........... B29C 45/14655 264/272.13 |
| 2009/0291532 A1* | 11/2009 | Takase | .................... B29C 43/18 438/127 |
| 2013/0037990 A1* | 2/2013 | Lin | ....................... B29C 33/123 264/272.17 |

FOREIGN PATENT DOCUMENTS

| | | | | |
|---|---|---|---|---|
| JP | 4184944 A | | 7/1992 | |
| JP | 04201220 A | | 7/1992 | |
| JP | 04336214 A | * | 11/1992 | ......... B29C 45/0046 |
| JP | 4336214 A | | 11/1992 | |
| JP | 557751 A | | 3/1993 | |
| JP | 05304180 A | * | 11/1993 | ......... B29C 45/2708 |
| JP | 6315956 A | | 11/1994 | |
| JP | 11150138 A | | 6/1999 | |
| JP | 2977889 B2 | | 9/1999 | |
| JP | 2977889 B | | 11/1999 | |
| JP | 11330112 A | | 11/1999 | |
| JP | 11348065 A | | 12/1999 | |
| JP | 2000280302 A | | 10/2000 | |
| JP | 2000299335 A | | 10/2000 | |
| JP | 200371885 A | | 3/2003 | |
| JP | 2003071885 A | * | 3/2003 | |
| JP | 2008539583 A | | 11/2008 | |
| JP | 4230044 B2 | | 12/2008 | |
| JP | 2012192532 A | | 10/2012 | |
| KR | 1020080003417 A | | 1/2008 | |
| KR | 101138561 B1 | | 5/2012 | |
| TW | 500656 B | | 9/2002 | |
| WO | 2004070838 A2 | | 8/2004 | |
| WO | 2007001178 A2 | | 1/2007 | |

\* cited by examiner

MOULD, MOULDING APPARATUS AND METHOD FOR CONTROLLED OVERMOULDING OF A CARRIER WITH ELECTRONIC COMPONENTS AND MOULDED PRODUCT

CROSS-REFERENCE TO RELATED APPLICATIONS

This application is the United States national phase of International Application No. PCT/NL2015/050854 filed Dec. 10, 2015, and claims priority to The Netherlands Patent Application No. 2013978 filed Dec. 15, 2014, the disclosures of which are hereby incorporated in their entirety by reference.

BACKGROUND OF THE INVENTION

Field of the Invention

The present invention relates to a mould for at least partially encapsulating a carrier with electronic components, comprising: at least two mould parts, at least one of which being provided with at least one mould cavity recessed into a contact side for enclosing electronic components placed on a carrier, the contact surface at least partially enclosing the mould cavity for medium-tight connection onto the carrier; and a feed channel for moulding material recessed into the contact surface of the mould part provided with the mould cavity. The invention also relates to a moulding apparatus, a method for at least partially encapsulating a carrier with electronic components and a carrier with electronic components encapsulated with moulding material according to this method.

Description of Related Art

The encapsulation of electronic components mounted on a carrier, and more particularly the encapsulation of semiconductor circuits (chips)/integrated circuits (IC's), according to the prior art makes use of encapsulating presses provided with at least two co-operating mould parts. Into at least one of the mould parts one or plural mould cavities are recessed. After placing the carrier with the electronic components for encapsulating between the mould parts, the mould parts may be moved towards each other, e.g. such that they clamp the carrier. Subsequently a, normally heated, liquid moulding material may then be fed through at least one moulding material feed channel (also referred to as "runner") to the mould cavity or the plural mould cavities, usually by means of transfer moulding. Epoxy may be applied as moulding material (also referred to as resin), which is generally provided with filler material. After at least partial (chemical) curing of the moulding material in the mould cavity/cavities, the mould parts are moved apart and the carrier with encapsulated electronic components is removed from the encapsulating press. In a subsequent processing step the encapsulated products may be separated from each other, for instance by sawing, laser cutting and/or water cutting. The at least partial covered electronic components may be used in various applications. This method of moulding is practised on large industrial scale and enables well controlled moulding of electronic components. Problems with moulding electronic components relate the control of the filling of the mould cavity/cavities with moulding material and the control of the removal of the moulded products from the encapsulation press.

The present invention has for its object to provide an efficient method and device that enable an enhanced control on both; the filling the of the mould cavity/cavities with moulding material and the removal of the moulded products from the mould.

SUMMARY OF THE INVENTION

This object is achieved with a mould for at least partially encapsulating a carrier with electronic components, comprising: at least two mould parts, at least one of which being provided with at least one mould cavity recessed into a contact side for enclosing electronic components placed on a carrier, the contact surface at least partially enclosing the mould cavity for medium-tight connection onto the carrier; and a feed channel for moulding material recessed into the contact surface of the mould part provided with the mould cavity; wherein in the mould part with the feed channel is provided with a displaceable barrier element connecting to the feed channel for regulating the size of an moulding material passage in the feed channel, which barrier element is displaceable in a direction substantially perpendicular to the contact surface.

The mould parts are displaceable relative to each other so that in a closed position at least one mould cavity encloses an electronic component. The feed of moulding material (which may also be referred to as "encapsulating material") usually takes place by means of a plunger with which moulding material, which has become liquid as a result of heating and is then pressed into the mould cavities. Such moulding process is also referred to as "transfer moulding". Within the context of this invention other methods of feeding moulding material are however possible, such as for instance by means of injection moulding. In respect of the moulding material there are also other alternatives within the context of the invention, such as for instance the feed of moulding material supplied in liquid form (liquid epoxy) or for instance a thermo-curing moulding material consisting of at least two separately supplied components which cure as a result of mixing. Flow rate and pressure of the feed of moulding material can hereby be adjusted.

One of the advantages of the present invention is that the displaceable barrier element may provide plural functions. First the feed of the moulding material may be controlled such that an optimal filling of the moulding cavity may be realised. In this respect situational circumstances may influence the best position of the displaceable barrier element in the feed channel, which may—among others—be dependent from the type of moulding material, the temperature of the moulding material, the number of moulding cavities connected to a source of moulding material, the contamination of a mould part, the specification of the carrier with electronic components, and so on. Dependent on these and other variables the size of an moulding material passage in the feed channel may be regulated by displacement of the barrier element more or less in the feed channel. A further advantage of the displaceable barrier element is that after at least partial curing of the moulding material in the feed channel the barrier element may also be used to exert a pressure on the moulding material in the feed channel and to so at least support the release of the moulded product from a mould part in the situation where the mould parts are moved apart. The release of the moulded product from a mould part is also referred to as "degating". As the pressure to release the moulded product from the mould may be exerted by the displaceable barrier element at the moulding material in the feed channel the displaceable will not leave any marks on the moulded product and on the other hand the pressure may be exerted on the moulded product close to the moulding cavity which is supportive for an effective and efficient moulded product release. An even further option to use the displaceable barrier element is to close off the feed channel after filling the mould cavity with liquid moulding material but before the moulding material in the feed channel is cured. By closing off the feed channel already in this early stage of the moulding process (before the at least partial curing of the moulding material in the feed channel) the situation of the filling of the mould cavity is not dependent on the situation of the feed channel before the feed channel is closed off, (e.g., the situation where the plunger(s) feed the moulding material towards the mould cavity. This also provides the additional opportunity to control the pressure on the liquid moulding material in the moulding cavity (so before the curing of the moulding material in the moulding cavity takes place) by controlling the force of the mould parts to clamp the carrier (also referred to as "the clamping force of the mould parts). By for instance increase of the clamping force after the moulding cavity is "isolated" from the feed channel by blocking the feed channel with the displaceable barrier element the moulding process may even be compared with "compression moulding" wherein the pressure on the moulding material is dependent on the clamping force. An advantage may be that the pressure on the moulding material in the moulding cavity (cavities) may be more constant over a mould cavity compared to the situation wherein the pressure is exerted from the runner wherein a pressure change occurs from the connection of the runner to the moulding cavity to locations in the moulding cavity on a distance of the connection of the runner to the moulding cavity. The more even pressure distribution in the moulding cavity may lead to an increase of the moulding quality. A further advantage of the "isolation" of the mould cavity from the runner in this early stage of the moulding process is that in enables to variety the pressure on the moulding material in the moulding cavity during the moulding (so e.g. to raise the pressure during a sort period of time once or several times). The additional freedom in pressure control on the moulding material before and during the curing of the moulding material in the moulding cavity provides an additional measure of freedom in control of the moulding process.

The mould part with the feed channel and the displaceable barrier element may be provided with a drive for controlling the relative position of the displaceable barrier element to the feed channel for moulding material. The provision of a drive system to control the position of the displaceable barrier element enables to optimise the use of the barrier segment. As an alternative, or in combination with a driven displaceable barrier element control, the displaceable barrier element may be resiliently connected to the mould part. The resilient connection may be provided with a positioning element to hold the displaceable barrier in a position wherein the displaceable barrier is not (or only limited) blocking the feed channel for moulding material in a closed situation of the mould. However when the mould is opened the positioning element may be constructed such that the positioning element is not supported anymore by a counter mould part such that the resilient connection forces the positioning element into the feed channel.

The mould part may also be provided with a foil handling mechanism. As to shield the displaceable barrier element from the moulding material a foil layer may be applied in between the wall of the feed channel and the displaceable barrier element. The use of a foil layer prevents (liquid) moulding material to penetrate between the wall of the feed channel and the displaceable barrier element. The foil layer may also cover the wall of the moulding cavity. Apart for keeping the mould part clean a further advantage of the use of a foil layer to shield the mould part is that is support an easy release of the moulded product from the mould part. The first step of the release may be provided by activating the displaceable barrier element pushing onto the foil and after a partial and/or local release of the foil form the mould part further release may be provided by for instance gas pressure. The mould part may thus also be provided from a least one gas outlet to blow a gas between the foil material (covering the moulded product) and the mould part.

The displaceable barrier element on the free end directed towards the contact side of the mould part may be provided with a tapering end. Such a tapering end provides the opportunity to separate the moulding material in the feed channel with the displaceable barrier element, especially when the moulding material is not fully hardened yet.

The mould part may also be provided with plural feed channels for moulding material, each connecting to a displaceable barrier element. Often moulds are provided with plural feed channels. For such moulds the choice is to provide one or more of the plural feed channels with a displaceable barrier element. Dependent on the situational conditions a part or all of the plural feed channels may be provided each with an individual displaceable barrier element. The plural feed channels for moulding material may be connect to a single moulding cavity. The present invention may be applied in mould configurations with only a single mould cavity or plural mould cavities provided in a mould part. Even a combination of two mould parts, both with at least one moulding cavity, may connect on opposite sides of the carrier and so to arrange layers of moulding material on the two opposite sides of the carrier. Furthermore the mould part with the feed channel for moulding material may also be provided with an outlet channel recessed into the contact surface and connecting to the mould cavity for discharge of gas from the mould cavity.

For more control of the moulding conditions the mould part with a moulding cavity may be provided with at least one sensor for detecting the pressures prevailing in the mould cavity and/or the feed channel for moulding material.

In a further alternative embodiment a first mould part may be provided with an additional clamping mould part, which additional clamping mould part is movable in respect to the first mould part to clamp at least one edge of a board to the first mould part, which clamping mould part in a closed position of the mould connects to the feed for moulding material. By including such clamping mould part a covered side of the board may kept free of moulding material which may be useful during further processing of the moulded product.

The present invention also provides a moulding apparatus for at least partially encapsulating a carrier with electronic components, comprising: a press including at least two mould carriers and a drive for relative movement of mould carriers; a mould according to the present invention and as disclosed above; and a feed for liquid moulding material connecting onto the feed channel for moulding material. The feed for liquid moulding material may comprise one or more plungers which are each movable in a cylinder casing. Also the moulding apparatus may be provided with an intelligent control for controlling the press, the feed for liquid encapsulation material and the displaceable barrier element in the mould. In such a moulding apparatus the displaceable barrier element will provide the additional functionality as already explained in relation to the mould according to the present invention. For intelligent control and/or steering of the displaceable barrier element the moulding apparatus may be provided with an (electronic) intelligent control system. Also included in such intelligent control system may be means for controlling the closing pressure with which the mould parts connect to the carrier so that the pressure exerted by the liquid moulding material on the mould may partially or fully be compensated by a regulated closing pressure.

The present invention also provides a method for at least partially encapsulating a carrier with electronic components, comprising the processing steps: A) placing a carrier with electronic components on a first mould part; B) moving the mould parts towards each other such that the carrier with electronic components is clamped between at least two mould parts and the electronic components to be encapsulated are enclosed by a mould cavity recessed into a contact side of a mould part; C) feeding a liquid moulding material via a feed for liquid encapsulation material recessed into a contact side of a mould part into the mould cavity; and D) moving apart the mould parts to remove the carrier with at least partially cured moulded electronic components from the mould parts; wherein during processing step C) a displaceable barrier element is moved in the feed for liquid encapsulation material to control the liquid moulding material flow, and wherein during processing step D) the displaceable barrier element is moved to push the at least partially cured moulding material out of the feed. With this method the moulding process of carriers with electronic components may be further optimised as it enables better control of the feed of the encapsulating material and it facilitates an improved removal of the moulded product from the mould. The displaceable barrier element may be moved in a direction substantially perpendicular to a contact surface of the mould part wherein the feed for liquid encapsulation material is recessed. For a further explanation of the advantages of the method according to the present invention reference is made to the above listed advantages of the mould according to the present invention. During the closing of the mould a contact surface at least partially enclosing a mould cavity may medium-tight (so tight that a medium like a gas or liquid may not pass) connect onto the carrier to prevent leakage of liquid moulding material between the contact surface of a mould part and the carrier. Furthermore the closing pressure exerted on the carrier by the mould parts may be controlled during feed of the moulding material to prevent the contact surface to exert to high pressure on the carrier at the moments when the liquid moulding material is not providing substantial counter-pressure and to prevent the contact surface to exert to low pressure on the carrier at the moments when the liquid moulding material is providing substantial counter-pressure. After to moulding process is completed and the moulded product is removed from the mould the carrier may be subdivided into smaller segments.

After a carrier with electronic components may be placed on a first mould part according to processing step A) and before the mould parts are moved towards each other such that the carrier with electronic components is clamped between two mould parts according to processing step B) at least one edge of the board the board is clamped to the first mould part with an additional mould part which additional mould part also guides the liquid moulding material to the mould cavity during processing step C). This type of moulding is also referred to a "top edge moulding" as the liquid moulding material is fed over the edge with an intermediate mould part covering the edge of the carrier. The advantages are that the edge of the carriers is kept free of moulding material and that the carrier is clamped in its position.

The method may also comprise that before feeding a liquid moulding material according processing step C) via a feed for liquid encapsulation material recessed into a contact side of a mould part into the mould cavity at least a part of the mould part is covered by a foil layer. The advantages of using a foil layer, shielding the mould from contamination and enabling easy release of the moulded product, are already explained in more detail above in relation to the mould part according the present invention which motivation is here incorporated by reference in relation to the method according the present invention.

The method may also provide that the displaceable barrier element after finishing processing step C) is moved further in the feed for liquid encapsulation material to separate the mould cavity filled with liquid moulding material from the runners part faced away from the mould cavity and that the force that a closing force of the mould parts is varied to change the pressure on the moulding material in the moulding cavity. Also some advantages of this embodiment of the method according the present invention, especially the enhanced control of the pressure on the moulding material in the moulding cavity during the curing, are explained above and are here incorporated by reference.

Finally the present invention also provides a carrier with electronic components, which electronic components are at least partially encapsulated with moulding material according to the method according the present invention as specified above. The carrier may be a semiconductor wafer, a layered substrate, a glass carrier or any other carrier or carrier combination for electronic components.

BRIEF DESCRIPTION OF THE DRAWING

The present invention will be further elucidated on the basis of the non-limitative exemplary embodiments shown in the following figures. Herein shows.

DESCRIPTION OF THE INVENTION

Figure 1:
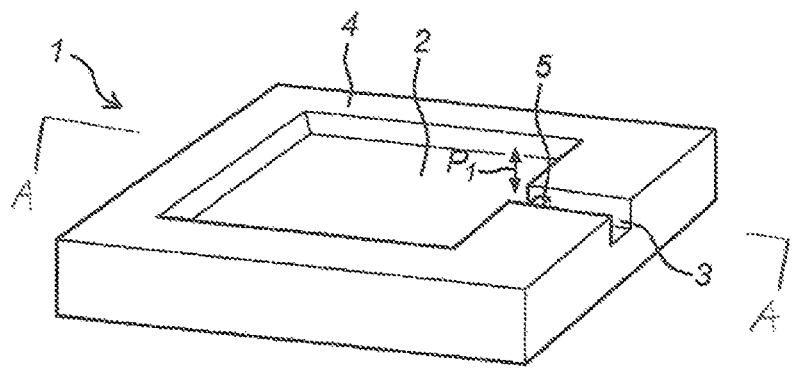
FIG. 1 a perspective view of a mould part of a mould according to the invention.

FIG. 1 shows schematic perspective view on a mould part 1 of a mould for encapsulating carriers for electronic components. Into the mould part 1 a mould cavity 2 and a moulding material feed channel 3 are recessed while a contact surface 4 except for the feed channel—surrounds the mould cavity 2. For moulding a carrier (not shown in this figure) is placed against a contact surface 4 such that the electronic components to be moulded (also not shown here) are located in the mould cavity 2. Though the feed channel 3 (also referred to as "runner") subsequently a liquid moulding material is fed to the mould cavity 2. To regulate the flow of moulding material in the feed channel 3, and thus also to regulate the moulding material flow into the mould cavity 2, a displaceable barrier element 5 is moveable in the feed channel 3 according arrow Pi. The direction of movement of the displaceable barrier element 5 substantially perpendicular to the contact surface 4. When the displaceable barrier element 5 is moved more into the feed channel 3 the displaceable barrier element 5 will more obstruct the feed channel 3 and thus, as a result, during moulding the flow of liquid moulding material into the mould cavity 2 will be limited. By moving the displaceable barrier element 5 more out of the feed channel 3 the feed channel will be less obstructed and thus the flow of liquid moulding material into the mould cavity 2 will increase.

Figure 2A:
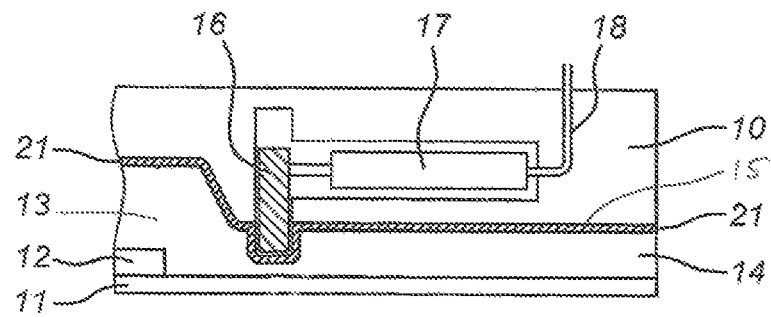
FIGS. 2A-2C three successive cross-sectional views taken along a plane defined by line A-A in FIG. 1, of the method encapsulating a carrier with electronic components according to the invention.

In FIG. 2A a cross-sectional view of a mould part 10 and a carrier 11 with electronic component 12 showing a processing step before moulding material is fed to a moulding cavity 13. In the mould part 10 a feed channel 14 for moulding material is recessed into a contact surface 15. The figure also shows a displaceable barrier element 16 connecting to the feed channel 14 for regulating the size of an moulding material passage in the feed channel 14. The displaceable barrier element 16 is shown in a position where it partially obstructs the feed channel 14. For the displacement of the barrier element 16 in the mould part 10 a drive 17 is incorporated which is able to move the barrier element 16 in a direction substantially perpendicular to the contact surface 15 of the mould part 10. For control of the drive 17—and thus for control of the position of the displaceable barrier element 16 a power and control line 18 is connected to the drive, which will be connected with an intelligent control system (which is not shown in this figure). Also depicted in this figure is a foil layer 21 which covers the mould part 10, at least the wall forming the feed channel 14 and the wall forming the moulding cavity 13, from the volume of the feed channel 14 and the moulding cavity 13 to be filled with moulding material (see FIG. 2B). The foil layer 21 keeps the barrier element 16 free of contact with moulding material (and thus prevents it to become polluted with remaining moulding material) and assists an easy release of moulded products from the mould part 10.

Figure 2B:
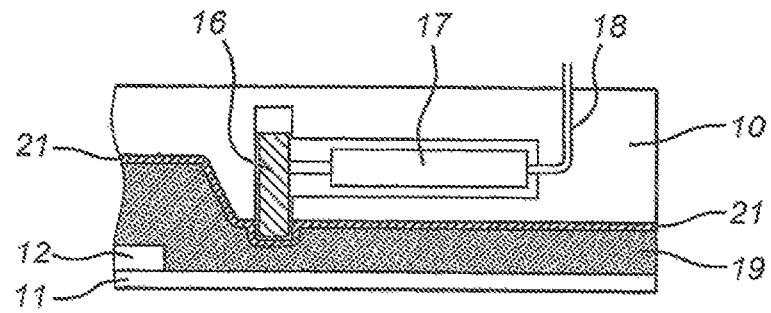

In FIG. 2B a cross-sectional view of the mould part 10 from FIG. 2A is shown again, however now in the situation wherein a moulding material 19 is fed through the feed channel 14 which also fills the moulding cavity 13. For control of the filling of the moulding cavity 13 in this specific situation the barrier element 16 is moved more away (in this situation upward) from the feed channel 14 compared to the position of the barrier element 16 shown in FIG. 2A. The foil layer 21 keeps mould part 10 free from contact with the moulding material 19.

Figure 2C:
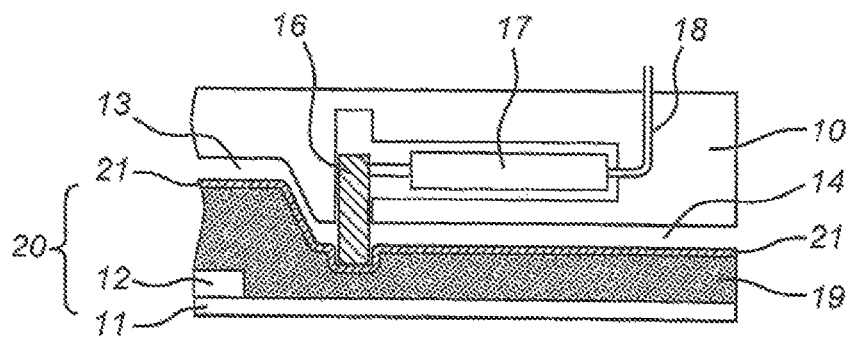

Also in FIG. 2C a cross-sectional view of the mould part 10 from FIGS. 2A and 2B is shown however this figure shows the situation after the moulding material 19 in the feed channel 14 and the moulding cavity 13 is at least partially cured. The barrier element 16 is in this situation used as a pusher ("ejector") to make the moulded carrier 11 with electronic component 12 free from the mould part 10. During the release of the cured moulding material 19 the foil layer 21 keeps attached to the moulding material 19. For instance the detachment of moulded product 20 may be further supported with a gas pressure system (which not shown here).

Figure 3A:
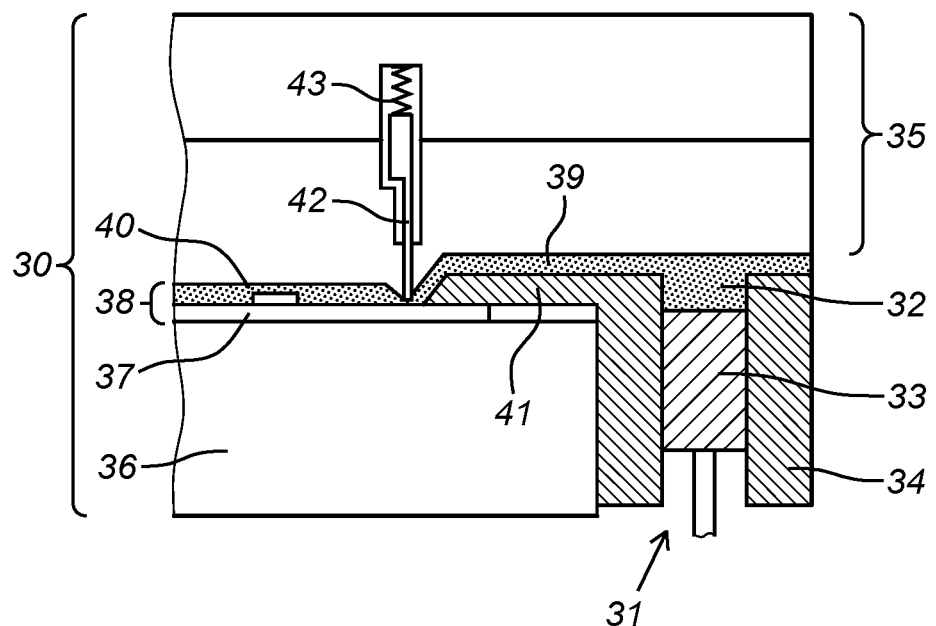
FIG. 3A a cross-sectional view taken along the plane defined by line A-A in FIG. 1, of a second embodiment of a mould according to the invention.
Figure 3B:
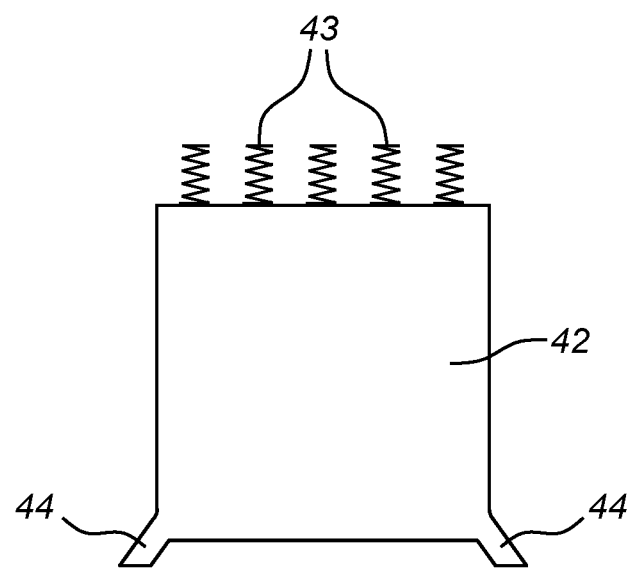
FIG. 3B a front view on a displaceable barrier element of the mould part shown in FIG. 3A.

In FIG. 3A a cross-sectional view of a part of a complete mould 30 is shown as well as a feed 31 for liquid moulding material. Moulding material 32 is supplied by a plunger 33 which is movable in a cylinder casing 34. The mould 30 is provided with an upper mould part 35 and a lower mould part 36. Both mould parts 35, 36 can be moved apart for the purpose of placing a carrier 37 for encapsulating or removing an encapsulated carrier 38. The moulding material 32 is transferred by the plunger 33 through a feed channel 39 and subsequently into a moulding cavity 40. In this figure also an additional mould part 41 is provided that clamps an edge part of the carrier 37 against the lower mould part 36. The additional mould part 41 in this embodiment is combined with the cylinder casing 34. The moulding material 32 thus flows through the feed channel 39, over a part of the additional mould part 41 to the moulding cavity 40. In the upper mould part 35 a displaceable barrier element 42 is incorporated connecting to the feed channel 39, which displaceable barrier element 42 may be driven by a spring package 43. For a further explanation of the working of the drive by the spring package 43 see also FIG. 3B wherein the displaceable barrier element 42 is shown in a side view (compared to the cross-sectional view of FIG. 3A). The displaceable barrier element 42 is provided with protruding parts 44 that in a closed situation of the mould 30 rests on the lower mould part 36. When the upper and lower mould parts 35, 36 are moved apart the protruding parts 44 of the displaceable barrier element 42 are not supported anymore by the lower mould part and thus the pressure exerted by the springs 43 may push the displaceable barrier element 42 downwards so that the displaceable barrier element 42 acts as a ejector.

Figure 4:
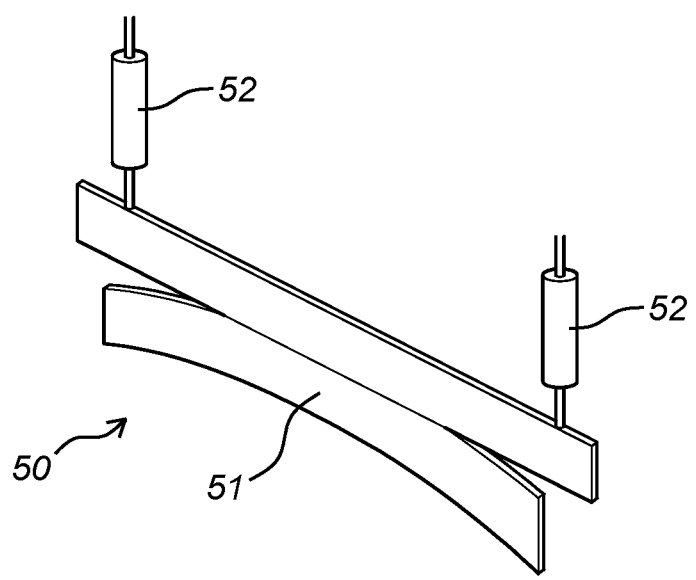
FIG. 4 a perspective view of an alternative embodiment of a displaceable barrier element.

In FIG. 4 an alternative embodiment of a displaceable barrier element 50 is shown. Dependent on the shape of a feed channel the barrier element 50 is cooperating with the shape may be adapted. In the illustrated embodiment the contact part 51 of the displaceable barrier element 50 is curved. Also different compared to the embodiments shown in the previous figures here the drive 52 is embodied as two cylinders.

It will be apparent that the measures discussed in the different embodiments may be combined with each other.

The invention claimed is:
1. A mould for at least partially encapsulating a carrier with electronic components, comprising:
at least two mould parts, at least one of which being provided with at least one mould cavity and a contact surface, wherein the mould cavity is configured for enclosing electronic components placed on the carrier, and the contact surface is configured for at least partially enclosing the mould cavity, contacting the carrier and forming a tight connection with the carrier; and
a feed channel for feeding moulding material recessed into the contact surface of the mould part provided with the mould cavity;
wherein the mould part with the feed channel is further provided with:
a displaceable barrier element connecting to the feed channel configured for regulating the size of a passage in the feed channel, which barrier element is displaceable in a direction substantially perpendicular to the contact surface, and
a foil layer between a wall of the feed channel and the displaceable barrier element;
wherein the displaceable barrier element is configured for exerting a pressure onto the foil layer in a situation where the mould parts are moved apart to locally release the carrier with electronic components from the mould part with the feed channel,
wherein the displaceable barrier element includes a curved contact part that partially shapes a resulting package of moulding material that encapsulates at least one of the electronic components.

2. The mould as claimed in claim 1, wherein the mould part includes a drive for controlling the relative position of the displaceable barrier element to the feed channel.

3. The mould as claimed in claim 1, wherein the displaceable barrier element is resiliently connected to the mould part.

4. The mould as claimed in claim 1, wherein the mould part is provided with multiple feed channels for feeding moulding material, each connecting to a displaceable barrier element.

5. The mould as claimed in claim 1, wherein the mould part with the feed channel is also provided with an outlet channel recessed into the contact surface and connecting to the mould cavity for discharge of gas from the mould cavity.

6. The mould as claimed in claim 1, wherein the mould part with the mould cavity is provided with at least one sensor for detecting the pressures prevailing in the mould cavity and/or the feed channel.

7. The mould as claimed in claim 1, wherein one of the two mould parts is provided with a clamping mould part, the clamping mould part is configured to move with respect to said one of the two mould parts to clamp at least one edge of the carrier to said one of the two mould parts, wherein the clamping mould part is in fluid communication with the feed channel when the mould is in a closed position.

* * * * *